United States Patent
Kambe et al.

(10) Patent No.: US 11,270,482 B2
(45) Date of Patent: Mar. 8, 2022

(54) TIMING CHART VERIFICATION AIDING APPARATUS, TIMING CHART VERIFICATION AIDING METHOD, AND COMPUTER READABLE MEDIUM

(71) Applicant: Mitsubishi Electric Corporation, Tokyo (JP)

(72) Inventors: Mai Kambe, Tokyo (JP); Kaoru Imoto, Tokyo (JP); Shigeto Miyauchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 118 days.

(21) Appl. No.: 16/758,886

(22) PCT Filed: Dec. 19, 2017

(86) PCT No.: PCT/JP2017/045561
§ 371 (c)(1),
(2) Date: Apr. 24, 2020

(87) PCT Pub. No.: WO2019/123543
PCT Pub. Date: Jun. 27, 2019

(65) Prior Publication Data
US 2021/0375013 A1    Dec. 2, 2021

(51) Int. Cl.
*G06T 11/20*      (2006.01)
(52) U.S. Cl.
CPC .................. *G06T 11/206* (2013.01)
(58) Field of Classification Search
CPC ... G06T 11/206; G06F 30/3312; G01R 1/025; G01R 31/31912
See application file for complete search history.

(56) References Cited

U.S. PATENT DOCUMENTS

| | | | |
|---|---|---|---|
| 7,580,037 B1 * | 8/2009 | Iotov | G06T 11/206 345/440 |
| 2003/0043944 A1 * | 3/2003 | Fukuda | H04L 7/0012 375/354 |
| 2009/0278848 A1 * | 11/2009 | Robertson | G06T 11/206 345/440.2 |

FOREIGN PATENT DOCUMENTS

| | | | |
|---|---|---|---|
| JP | H06176095 A | 6/1994 | |
| JP | H06332972 A | 12/1994 | |
| (Continued) | | | |

OTHER PUBLICATIONS

International Search Report (PCT/ISA/210) dated Jan. 30, 2018, by the Japan Patent Office as the International Searching Authority for International Application No. PCT/JP2017/045561.
(Continued)

*Primary Examiner* — Jeffery A Brier
(74) *Attorney, Agent, or Firm* — Buchanan Ingersoll & Rooney PC

(57) ABSTRACT

In a timing chart verification aiding apparatus, a rough sketch creation unit accepts operation to designate positions of a plurality of points on a screen, connects the plurality of points with a line, and creates a rough sketch of a timing chart. A verification condition input aiding unit accepts operation to input a condition for verifying pass or fail of a test of at least one of the plurality of points on the screen. A timing chart reshaping unit reshapes, the timing chart created by the rough sketch creation unit based on the condition for verifying accepted by the verification condition input aiding unit. A timing chart display unit obtains time series data to be tested and displays a timing chart that shows variations in values of the time series data obtained and the timing chart after being reshaped by the timing chart reshaping unit in a superimposed manner.

9 Claims, 12 Drawing Sheets

(56) References Cited

FOREIGN PATENT DOCUMENTS

| JP | H0991335 A | 4/1997 |
|---|---|---|
| JP | 2001147714 A | 5/2001 |
| JP | 2002156403 A | 5/2002 |
| JP | 2006209354 A | 8/2006 |
| JP | 2007171100 A | 7/2007 |
| JP | 2016062136 A | 4/2016 |

OTHER PUBLICATIONS

Written Opinion (PCT/ISA/237) dated Jan. 30, 2018, by the Japan Patent Office as the International Searching Authority for International Application No. PCT/JP2017/045561.

Master's Thesis Viet Tiep Do: Knowledge-Based Pattern Recognition and Visualization of Error Recordings of Time-Based Motor Sensor Data: Requirements Analysis And Tool Support, Available online at: https://wwwmatthes.in.tum.de/pages/tbkc9bksewOg/Masters-Thesis-Viet-Tiep-DO, 2015, 99 pages including English abstract.

Office Action dated Nov. 4, 2021, issued in corresponding German Patent Application No. 112017008287.0, 19 pages including 5 pages of English translation.

\* cited by examiner

Fig. 10

| TEST SPECIFICATION ||| 
|---|---|---|
| [TEST PROCEDURE]<br>(1) SET VALUE TO PARAMETER P1. TURN POWER ON.<br>(2) ···<br>(3) ··· | [EXPECTED TEST RESULT]<br>(1) RISES AFTER T1 SECONDS AND FALLS AFTER T2 SECONDS. MAXIMUM VALUE ON Y AXIS DOES NOT EXCEED V1.<br>(2) ···<br>(3) ··· | [VERIFICATION RESULT]<br>(1)<br>(2)<br>(3) |
|  |  |  |

Fig. 11

| TEST SPECIFICATION ||| 
|---|---|---|
| [TEST PROCEDURE]<br>(1) SET VALUE TO PARAMETER P1. TURN POWER ON.<br>(2) ···<br>(3) ··· | [EXPECTED TEST RESULT]<br>(1) RISES AFTER T1 SECONDS AND FALLS AFTER T2 SECONDS. MAXIMUM VALUE ON Y AXIS DOES NOT EXCEED V1.<br>(2) ···<br>(3) ··· | [VERIFICATION RESULT]<br>(1) PASS. REFER TO TIMING CHART No. 01.<br>(2) FAIL. REFER TO TIMING CHART No. 02.<br>(3) ··· |
|  |  |  |

ALLOWABLE RANGE

TIMING CHART VERIFICATION AIDING APPARATUS, TIMING CHART VERIFICATION AIDING METHOD, AND COMPUTER READABLE MEDIUM

TECHNICAL FIELD

The present invention relates to a timing chart verification aiding apparatus, a timing chart verification aiding method, and a timing chart verification aiding program.

BACKGROUND ART

During a test of an electronic control device and the like built into a vehicle, an air conditioner, or the like, creation of a timing chart based on a specification and visual verification of the timing chart are sometimes performed.

Conventionally, for technologies that aid the creation of the timing chart based on a specification, and the visual verification of the timing chart, following technologies specialized in each domain such as an inspection of an electronic control device for a vehicle or a logic simulation of a semiconductor integrated circuit are proposed.

In Patent Literature 1, to aid the visual verification of the timing chart during the inspection of the electronic control device for a vehicle, a system that displays the timing chart based on the specification and a timing chart to be inspected on a same screen is proposed.

In Patent Literature 2, during the inspection of the electronic control device for a vehicle, a device that displays a timing chart of a signal selected from a list of signal patterns is proposed.

In Patent Literature 3, in the logic simulation of the semiconductor integrated circuit, a device that displays the timing chart along with a delay value of an output waveform from a reference point, a pulse width, and their allowable range, is proposed.

CITATION LIST

Patent Literature

Patent Literature 1: JP 2006-209354 A
Patent Literature 2: JP 2007-171100 A
Patent Literature 3: JP H06-332972 A

SUMMARY OF INVENTION

Technical Problem

There is a limit to a degree of freedom of the waveform of the timing chart that can be created by conventional technology, and a selection can only be made from a pulse wave or from a few patterns of a waveform.

The present invention aims to create a timing chart with a high degree of freedom.

Solution to Problem

A timing chart verification aiding apparatus according to one aspect of the present invention includes:
a rough sketch creation unit to accept operation to designate positions of a plurality of points on a screen, connect the plurality of points with a line, and create a rough sketch of a timing chart on the screen;
a timing chart reshaping unit to accept operation to input a condition for verifying pass or fail of a test of at least one of the plurality of points on the screen and reshape on the screen, the timing chart created by the rough sketch creation unit based on the condition for verifying; and
a timing chart display unit to accept operation to input time series data to be tested, and display a timing chart that shows variations in values of the time series data and the timing chart after being reshaped by the timing chart reshaping unit in a superimposed manner on the screen.

Advantageous Effects of Invention

According to the present invention, creation of a timing chart with a high degree of freedom is possible.

BRIEF DESCRIPTION OF DRAWINGS

FIG. 10 is a diagram illustrating a specific example of a test specification before outputting a result.
FIG. 11 is a diagram illustrating a specific example of a test specification after outputting a result.
FIG. 13 is a diagram illustrating a specific example of a data format.
FIG. 14 is a diagram illustrating a specific example of a data format.

DESCRIPTION OF EMBODIMENTS

Figure 1:
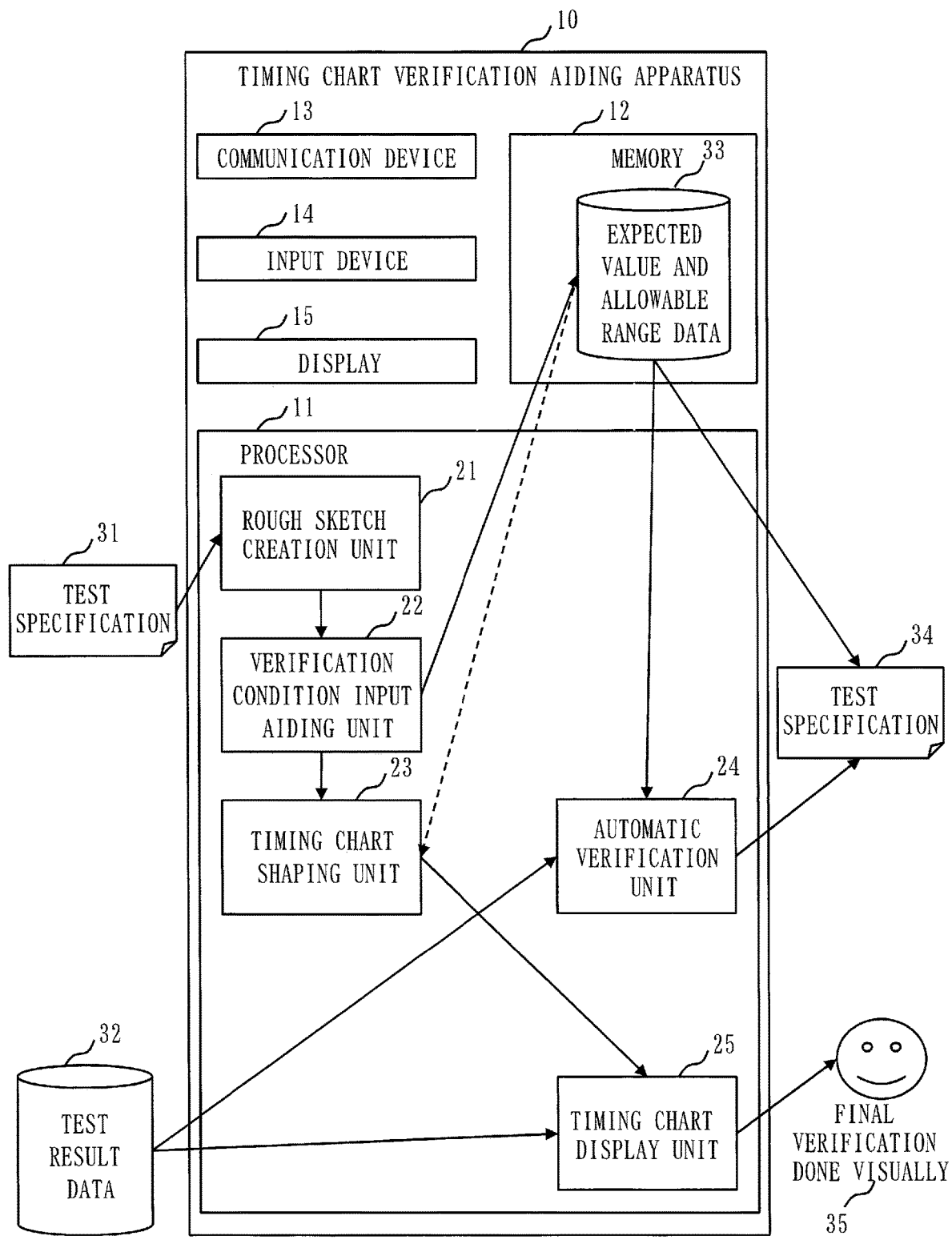
FIG. 1 is a block diagram illustrating a configuration of a timing chart verification aiding apparatus according to Embodiment 1.

Hereinafter, an embodiment of the present invention will be described, using the drawings. The same or equivalent portions are denoted by the same reference numerals throughout the respective drawings. Explanations of the same or equivalent portions will be suitably omitted or simplified in the description of the embodiment. The present invention is not limited to the embodiment to be described hereinafter, and various modifications are possible as necessary. For example, the embodiment to be described hereinafter may be partially implemented.

Embodiment 1

This embodiment will be described using FIGS. 1 to 14.
*Description of Configuration*
By referring to FIG. 1, a configuration of a timing chart verification aiding apparatus 10 according to this embodiment will be described.

The timing chart verification aiding apparatus 10 is a computer. The timing chart verification aiding apparatus 10 includes a processor 11 and also other hardware such as a memory 12, a communication device 13, an input device 14, and a display 15. The processor 11 is connected to other hardware via signal lines and controls these other hardware.

The timing chart verification aiding apparatus 10 includes, as functional elements, a rough sketch creation unit 21, a verification condition input aiding unit 22, a timing chart reshaping unit 23, an automatic verification unit 24, and a timing chart display unit 25. Functions of the rough sketch creation unit 21, the verification condition input aiding unit 22, the timing chart reshaping unit 23, the automatic verification unit 24, and the timing chart display unit 25 are realized by software.

The processor 11 is a device that executes a timing chart verification aiding program. The timing chart verification aiding program is a program that realizes functions of the rough sketch creation unit 21, the verification condition input aiding unit 22, the timing chart reshaping unit 23, the automatic verification unit 24, and the timing chart display unit 25. The processor 11 is, for example, a CPU, a GPU, a DSP, or a combination of at least some of these. "CPU" is an abbreviation for Central Processing Unit. "GPU" is an abbreviation for Graphics Processing Unit. "DSP" is an abbreviation for Digital Signal Processor.

The memory 12 is a device that stores the timing chart verification aiding program. The memory 12 is, for example, a RAM, a flash memory, or a combination of at least some of these. "RAM" is an abbreviation for Random Access Memory.

The communication device 13 includes a receiver that receives data inputted into the timing chart verification aiding program and a transmitter that transmits data outputted from the timing chart verification aiding program. The communication device 13 is, for example, a communication chip or an NIC. "NIC" is an abbreviation for Network Interface Card.

The input device 14 is a device operated by a user for inputting data to the timing chart verification aiding program. Especially, the input device 14 is used by the rough sketch creation unit 21, the verification condition input aiding unit 22, the timing chart reshaping unit 23, the automatic verification unit 24, and the timing chart display unit 25 for accepting an operation of a user. The input device 14 is, for example, a mouse, a keyboard, a touch panel, or a combination of at least some of these.

The display 15 is a device that displays data outputted from the timing chart verification aiding program on a screen. Especially, the display 15 is used by the rough sketch creation unit 21, the verification condition input aiding unit 22, the timing chart reshaping unit 23, the automatic verification unit 24, and the timing chart display unit 25 for displaying a GUI screen. "GUI" is an abbreviation for Graphical User Interface. The display 15 is, for example, an LCD. "LCD" is an abbreviation for Liquid Crystal Display.

As data inputted into the timing chart verification aiding program via the communication device 13 or the input device 14, there is at least a test specification 31 before outputting a result and data 32 which is a test result. As data to be stored in the memory 12 by the timing chart verification aiding program, there is at least data 33 such as an expected value and an allowable range. As data to be outputted from the timing chart verification aiding program via the communication device 13 or the display 15, there is at least a test specification 34 after outputting a result. A timing chart created by the timing chart verification aiding program is also outputted via the display 15 for final verification 35 done visually.

The timing chart verification aiding program is read into the processor 11 and executed by the processor 11. Not only the timing chart verification aiding program, but also an OS is stored in the memory 12. "OS" is an abbreviation for Operating System. The processor 11 executes the timing chart verification aiding program while executing the OS. A part or all of the timing chart verification aiding program may be built into the OS.

The timing chart verification aiding program and the OS may be stored in an auxiliary storage device. The auxiliary storage device is, for example, an HDD, a flash memory, or a combination of at least some of these. "HDD" is an abbreviation for Hard Disk Drive. If the timing chart verification aiding program and the OS are stored in the auxiliary storage device, the timing chart verification aiding program and the OS are loaded into the memory 12 and executed by the processor 11.

The timing chart verification aiding apparatus 10 may include a plurality of processors that replace the processor 11. These plurality of processors share the execution of the timing chart verification aiding program. Each processor is, for example, a CPU, a GPU, or a DSP.

Data, information, signal values, and variable values used, processed, or outputted by the timing chart verification aiding program are stored in the memory 12, the auxiliary storage device, or in a register or a cache memory in the processor 11.

The timing chart verification aiding program is a program that makes a computer execute processes performed by the rough sketch creation unit 21, the verification condition input aiding unit 22, the timing chart reshaping unit 23, the automatic verification unit 24, and the timing chart display unit 25 as a rough sketch creation process, a verification condition input aiding process, a timing chart reshaping process, an automatic verification process, and a timing chart display process, respectively. The timing chart verification aiding program may be provided being recorded in a computer-readable medium or may be provided being stored in a recording medium, or provided as a program product.

The timing chart verification aiding apparatus 10 may be configured of one computer or may be configured of a plurality of computers. If the timing chart verification aiding apparatus 10 is configured of a plurality of computers, functions of the rough sketch creation unit 21, the verification condition input aiding unit 22, the timing chart reshaping unit 23, the automatic verification unit 24, and the timing chart display unit 25 may be realized by being distributed to each computer.

*Description of Operation*
A summary of operation of the timing chart verification aiding apparatus 10 according to this embodiment will be described by referring to FIG. 1. The operation of the timing chart verification aiding apparatus 10 corresponds to a timing chart verification aiding method according to this embodiment.

The rough sketch creation unit 21 creates a rough sketch of a timing chart that is expected based on the test specification 31. The verification condition input aiding unit 22 aids inputting of a condition for verifying such as an expected value, an allowable range, and an event. The timing chart reshaping unit 23 reshapes the timing chart automatically based on the condition for verifying inputted by the verification condition input aiding unit 22. The automatic verification unit 24 automatically verifies pass or fail from the data 33 such as the expected value and the allowable range created by the verification condition input aiding unit 22, and the data 32 which is the test result, and outputs the test specification 34. The timing chart display unit 25 creates the timing chart for the final verification 35 done visually based on the data 32 which is the test result.

Details of the operation of the timing chart verification aiding apparatus 10 will be described referring to FIGS. 2 to 14.

Figure 2:
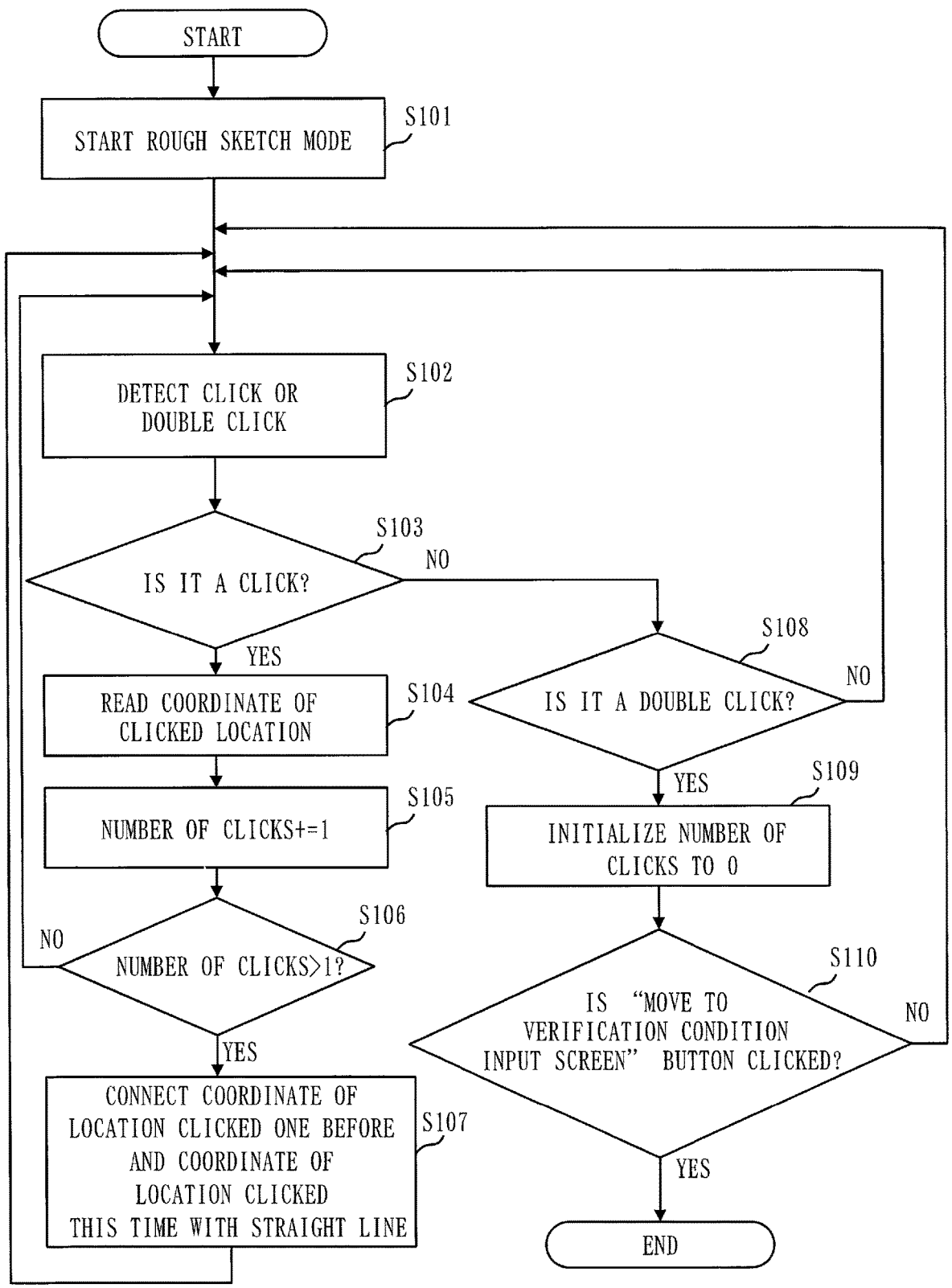
FIG. 2 is a flowchart illustrating operation of a rough sketch creation unit of a timing chart verification aiding apparatus according to Embodiment 1.

FIG. 2 illustrates a process flow of the rough sketch creation unit 21.

At step S101, the rough sketch creation unit 21 starts a rough sketch mode which creates a rough sketch, and proceeds to step S102.

At step S102, the rough sketch creation unit 21 detects an operation of a click or a double click from a user, and proceeds to step S103. A single click is mentioned as simply "click".

At step S103, the rough sketch creation unit 21 verifies whether the operation from the user is a click or not. If the operation is a click, the rough sketch creation unit 21 proceeds to step S104. If the operation is not a click, the rough sketch creation unit 21 proceeds to step S108.

At step S104, the rough sketch creation unit 21 reads an X coordinate and a Y coordinate values of a location where it was clicked, and proceeds to step S105.

At step S105, the rough sketch creation unit 21 increases a number of clicks by 1, and proceeds to step S106.

At step S106, if the number of clicks is more than 1, the rough sketch creation unit 21 proceeds to step S107. If the number of clicks is less than or equal to 1, the rough sketch creation unit 21 returns to step S102.

At step S107, the rough sketch creation unit 21 connects the coordinate of the location where it was clicked one before and the coordinate of the location where it was clicked this time with a straight line, and returns to step S102.

At step S108, the rough sketch creation unit 21 verifies whether the operation by the user is a double click or not. If the operation is a double click, the rough sketch creation unit 21 proceeds to step S109. If the operation is not a double click, the rough sketch creation unit 21 returns to step S102.

At step S109, the rough sketch creation unit 21 initializes the number of clicks to 0, and proceeds to step S110.

At step S110, the rough sketch creation unit 21 verifies whether a "Move to verification condition input screen" button is clicked or not. If the button is clicked, the rough sketch creation unit 21 ends the process flow. If the button is not clicked, the rough sketch creation unit 21 returns to step S102.

Figure 3:
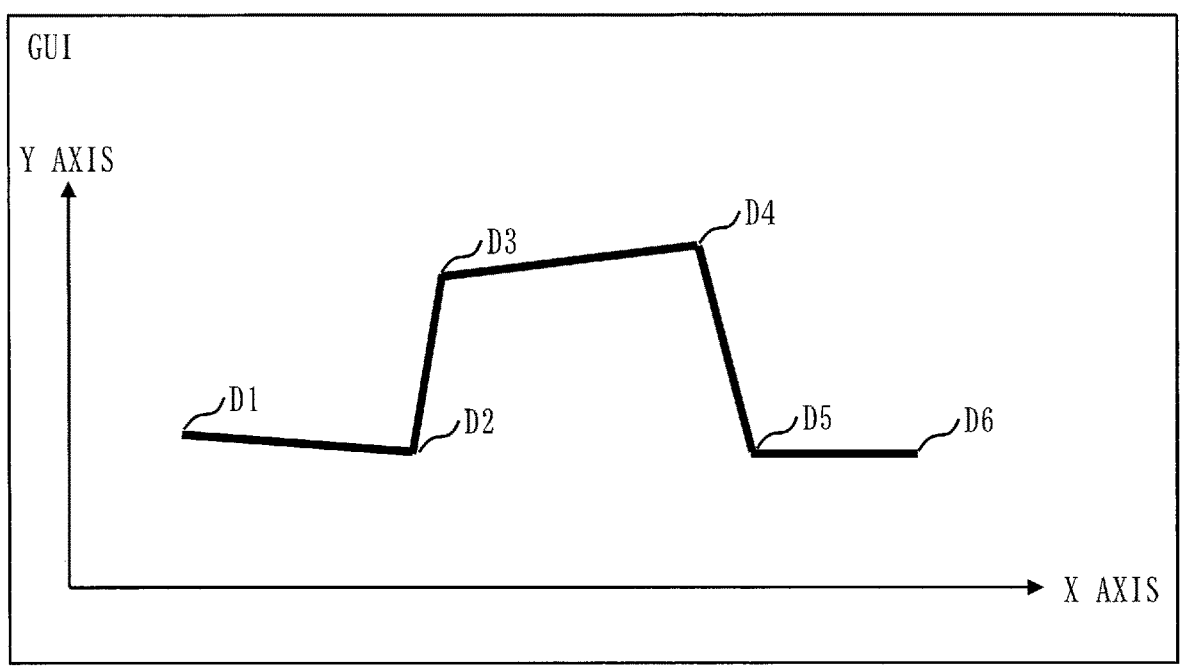
FIG. 3 is a diagram illustrating an example of a timing chart created by a rough sketch creation unit of a timing chart verification aiding apparatus according to Embodiment 1.

FIG. 3 illustrates an example of a timing chart created by the rough sketch creation unit 21.

As in this example, the rough sketch creation unit 21 accepts operation to designate positions of a plurality of points, D1, • • •, Dn, on a screen. Although n=6 in the example of FIG. 3, it is good if n>1. The rough sketch creation unit 21 connects the plurality of points, D1, • • •, Dn, with a line and creates a rough sketch of the timing chart on the screen.

In this embodiment, the rough sketch creation unit 21 creates an arbitrary waveform shown by a broken line as a rough sketch. That is, in this embodiment, the line that connects the plurality of points, D1, • • •, Dn, is a straight line, but for the positions of the plurality of points, D1, • • •, Dn, arbitrary positions may be designated.

Figure 4:
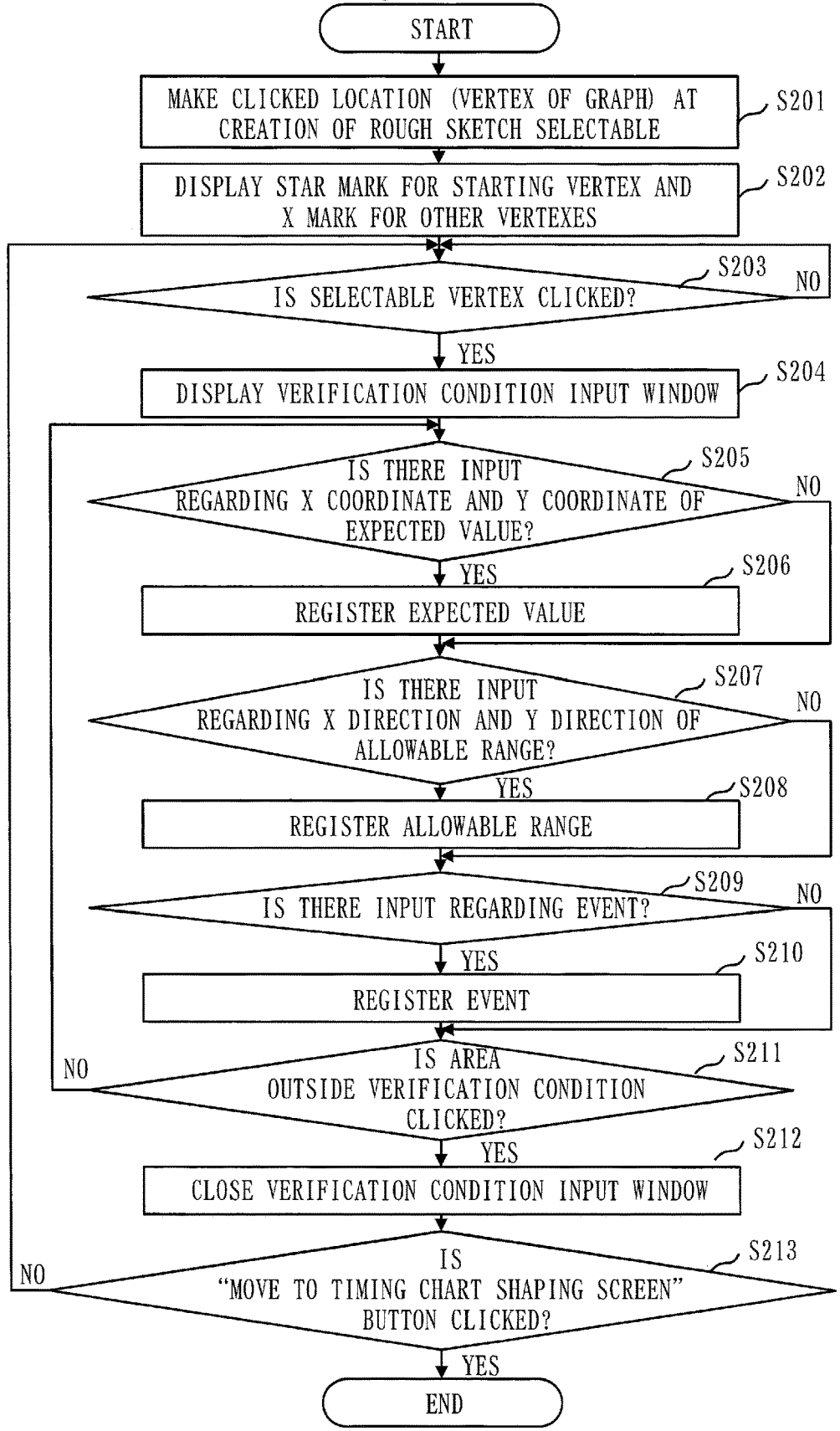
FIG. 4 is a flowchart illustrating operation of a verification condition input aiding unit of a timing chart verification aiding apparatus according to Embodiment 1.

FIG. 4 illustrates a process flow of the verification condition input aiding unit 22.

At step S201, the verification condition input aiding unit 22 makes a vertex of the timing chart created as a graph in the rough sketch creation unit 21 selectable and proceeds to step S202.

At step S202, the verification condition input aiding unit 22 displays a star mark for a starting vertex of the timing chart and an X mark for other vertexes, and proceeds to step S203.

At step S203, the verification condition input aiding unit 22 verifies whether or not a selectable vertex is clicked. If a selectable vertex is clicked, the verification condition input aiding unit 22 proceeds to step S204. If a selectable vertex is not clicked, the verification condition input aiding unit 22 repeats the verification of step S203.

At step S204, the verification condition input aiding unit 22 displays a window prompting input of a condition for verifying regarding the vertex clicked as a verification condition input window, and proceeds to step S205. In this embodiment, as the conditions for verifying, there are expected values such as two dimensional X coordinate and Y coordinate, an allowable range of errors in an X direction and a Y direction, and events such as rising and falling.

At step S205, the verification condition input aiding unit 22 verifies whether or not there is an input regarding the X coordinate or the Y coordinate of the expected value of the condition for verifying. If there is an input, the verification condition input aiding unit 22 proceeds to step S206. If there is no input, the verification condition input aiding unit 22 proceeds to step S207.

At step S206, the verification condition input aiding unit 22 registers the expected value by storing the data 33 which is the expected value, in the memory 12, and proceeds to step S207.

At step S207, the verification condition input aiding unit 22 verifies whether or not there is an input regarding the X direction and the Y direction of the allowable range of the condition for verifying. If there is an input, the verification condition input aiding unit 22 proceeds to step S208. If there is no input, the verification condition input aiding unit 22 proceeds to step S209.

At step S208, the verification condition input aiding unit 22 registers the allowable range by storing the data 33 which is the allowable range, in the memory 12, and proceeds to step S209.

At step S209, the verification condition input aiding unit 22 verifies whether or not there is an input regarding an event of the condition for verifying. If there is an input, the verification condition input aiding unit 22 proceeds to S210. If there is no input, the verification condition input aiding unit 22 proceeds to step S211.

At step S210, the verification condition input aiding unit 22 registers the event by storing the data 33 which is the event, in the memory 12, and proceeds to step S211.

At step S211, the verification condition input aiding unit 22 verifies whether or not an area outside of the condition for verifying is clicked. If the area is clicked, the verification condition input aiding unit 22 proceeds to step S212. If the area is not clicked, the verification condition input aiding unit 22 returns to step S205.

At step S212, the verification condition input aiding unit 22 closes the verification condition input window, and proceeds to step S213.

At step S213, the verification condition input aiding unit 22 verifies whether or not a "Move to timing chart reshaping screen" button is clicked. If the button is clicked, the verification condition input aiding unit 22 ends the process flow. If the button is not clicked, the verification condition input aiding unit 22 returns to step S203.

Figure 5:
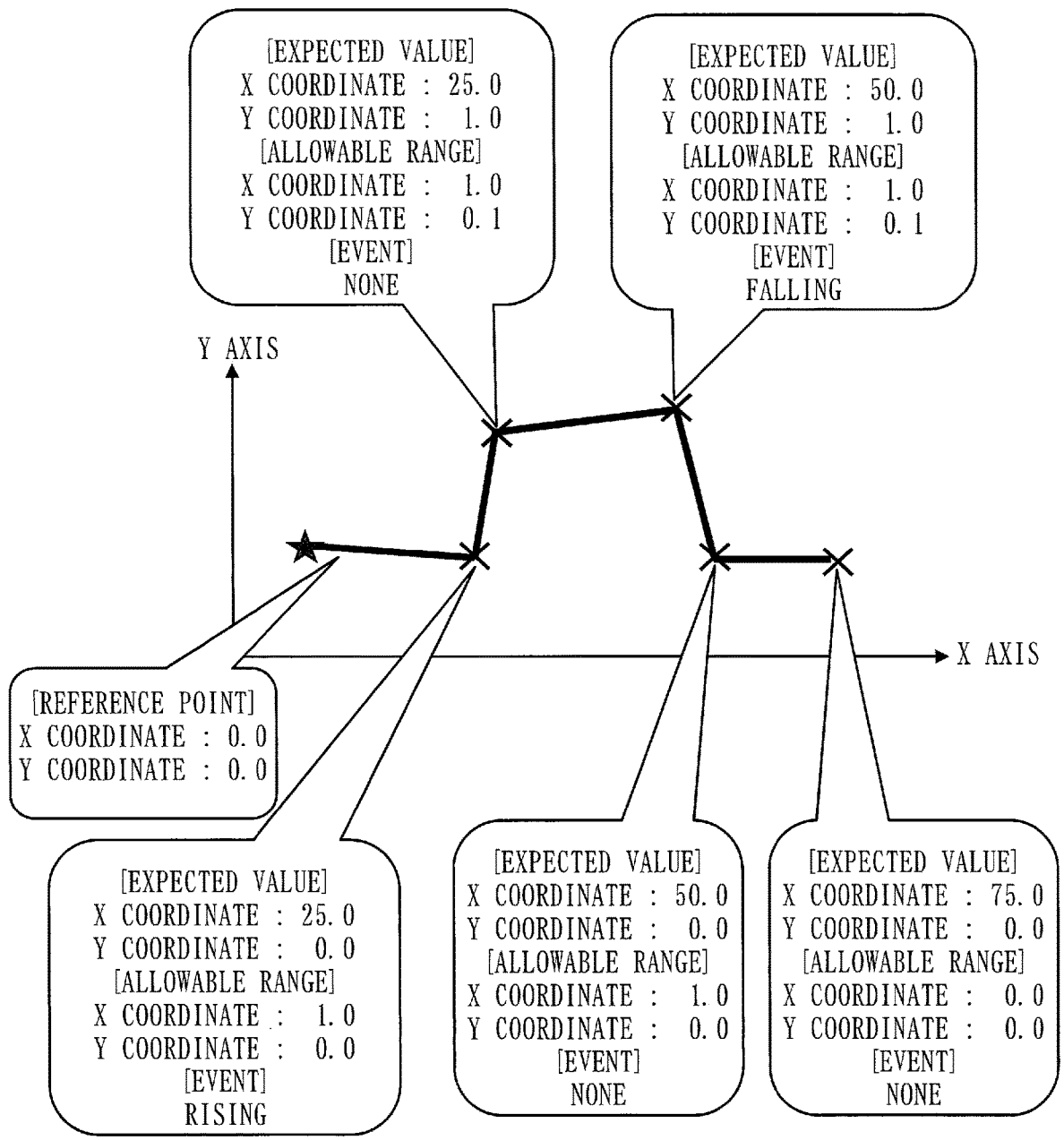
FIG. 5 is a diagram illustrating an example of a screen displayed by a verification condition input aiding unit of a timing chart verification aiding apparatus according to Embodiment 1.

FIG. 5 illustrates an example of a verification condition input screen displayed by the verification condition input aiding unit 22. Balloons represent the verification condition input windows.

As in this example, the verification condition input aiding unit 22 accepts operation to input a condition for verifying pass or fail of a test for at least one of the plurality of points, D1, • • •, Dn, on the screen.

In this embodiment, the verification condition input aiding unit 22 accepts operation to input, as a condition for verifying, an expected value of a position for at least one of the plurality of points, D1, • • •, Dn. In the example of FIG. 5, point D1 is set as a reference point, and expected values of the X coordinates and the Y coordinates for point D2, point D3, point D4, point D5, and point D6 are inputted.

In this embodiment, the verification condition input aiding unit 22 accepts operation to input, as a condition for verifying, an allowable range of deviation for at least one of the plurality of points, D1, • • •, Dn. In the example of FIG. 5, allowable ranges in the X direction and the Y direction for point D2, point D3, point D4, point D5, and point D6 are inputted.

In this embodiment, the verification condition input aiding unit 22 accepts operation to input, as a condition for verifying, an event value that indicates either one of rising and falling for at least one of the plurality of points, D1, • • •, Dn. In the example of FIG. 5, an event value that indicates rising is inputted for point D2 and an event value that indicates falling is inputted for point D4.

Figure 6:
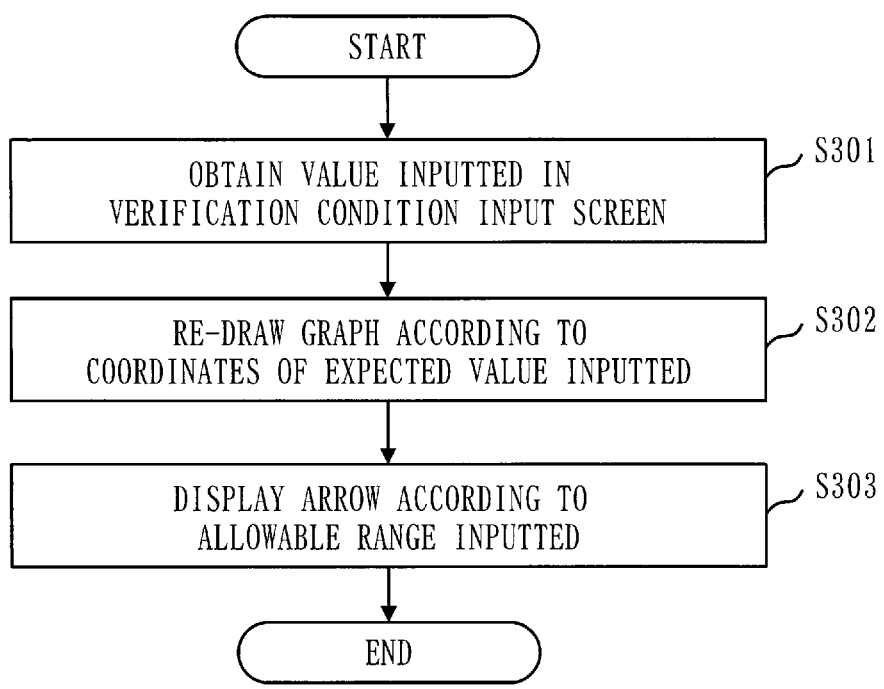
FIG. 6 is a flowchart illustrating operation of a timing chart reshaping unit of a timing chart verification aiding apparatus according to Embodiment 1.

FIG. 6 illustrates a process flow of the timing chart reshaping unit 23.

At step S301, the timing chart reshaping unit 23 obtains the value inputted in the verification condition input screen from the data 33, and proceeds to step S302.

At step S302, the timing chart reshaping unit 23 re-draws the timing chart according to the coordinates of the expected value inputted, and proceeds to step S303.

At step S303, the timing chart reshaping unit 23 displays an arrow according to the allowable range inputted, and ends the process flow.

Figure 7:
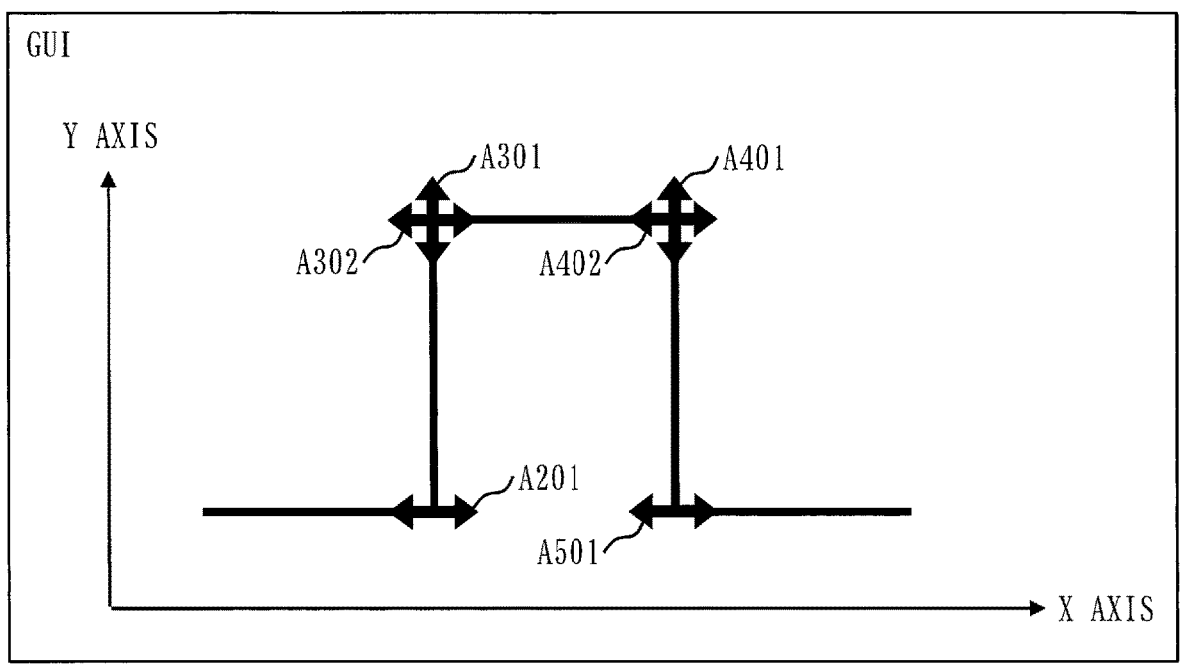
FIG. 7 is a diagram illustrating an example of a screen displayed by a timing chart reshaping unit of a timing chart verification aiding apparatus according to Embodiment 1.

FIG. 7 illustrates an example of a timing chart reshaping screen displayed by the timing chart reshaping unit 23.

As in this example, the timing chart reshaping unit 23 reshapes on the screen, the timing chart created by the rough sketch creation unit 21 based on the condition for verifying accepted by the verification condition input aiding unit 22.

In this embodiment, the timing chart reshaping unit 23 reshapes the timing chart created by the rough sketch creation unit 21 by setting the position of the corresponding point to the expected value accepted by the verification condition input aiding unit 22. In the example of FIG. 7, positions of point D2, point D3, point D4, point D5, and point D6 are adjusted.

In this embodiment, the timing chart reshaping unit 23 adds to the timing chart reshaped, a shape showing the allowable range accepted by the verification condition input aiding unit 22. As for the shape, an arbitrary shape that is able to show the range may be added, but in this embodiment, arrows are added. The allowable range may be set such that the allowable range is at least along an axis orthogonal to a time axis, but in this embodiment, the allowable range is also set along the time axis. For this reason, there is a case where both an arrow extending along the axis orthogonal to the time axis and an arrow extending along the time axis are added as shapes. In the example of FIG. 7, for point D2 and point D5, arrow A201 and arrow A501 that extend along the time axis are added respectively, and for point D3 and point D4, both arrow A301 and arrow A401 that extend along the axis orthogonal to the time axis and arrow A302 and arrow A402 that extend along the time axis are added respectively. The time axis corresponds to the X axis and the axis that is orthogonal to the time axis corresponds to the Y axis. With conventional technology, an arrow showing the allowable range in a vertical axis direction which is a direction that is orthogonal to a time axis direction cannot be displayed at a time of displaying the timing chart based on the specification for visual verification. Contrarily, in this embodiment, an arrow showing the allowable range can be displayed in the vertical axis direction. Therefore, a user can easily perform visual verification of the timing chart having a height in the vertical axis direction.

In this embodiment, the timing chart reshaping unit 23 reshapes the timing chart created by the rough sketch creation unit 21 by setting a direction of a line that is to be connected to a corresponding point to the event value inputted by operating the verification condition input aiding unit 22. In the example of FIG. 7, the timing chart is adjusted so that the line rises at point D2 and the line falls at point D4.

Figure 8:
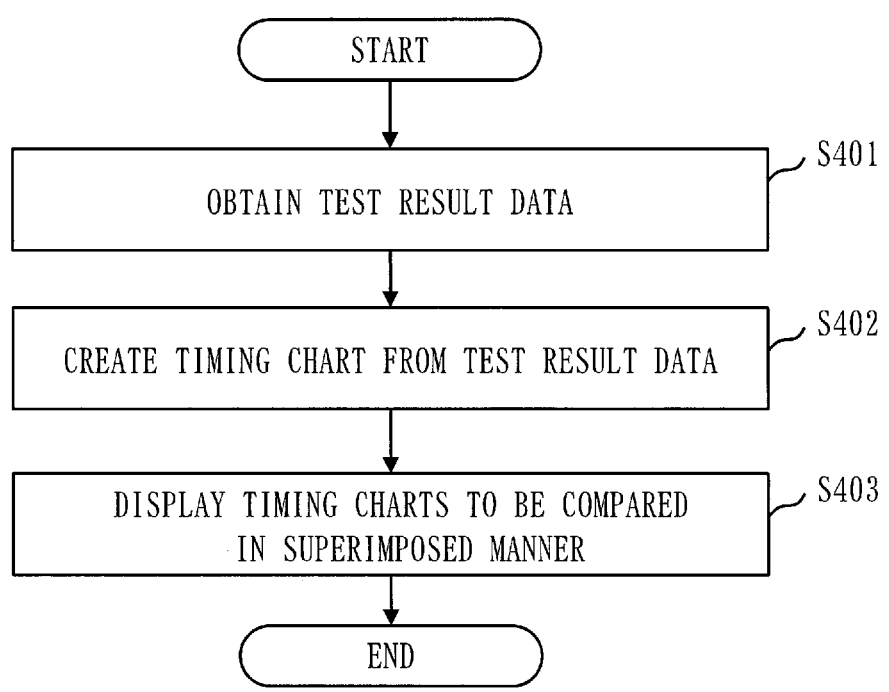
FIG. 8 is a flowchart illustrating operation of a timing chart display unit of a timing chart verification aiding apparatus according to Embodiment 1.

FIG. 8 illustrates a process flow of the timing chart display unit 25.

At step S401, the timing chart display unit 25 accepts inputting of the data 32 which is the test result, and proceeds to step S402. The data 32 which is the test result is an arbitrary time series data and the kind of domain in which the data is to be handled does not matter.

At step S402, the timing chart display unit 25 creates the timing chart from the data 32 inputted, and proceeds to step S403. Since the timing chart created by conventional technology specializes in each domain such as an inspection of an electronic control device for a vehicle or a logic simulation of a semiconductor integrated circuit, the timing chart can only be used in the same domain. On the contrary, in this embodiment, since the timing chart is created from the arbitrary time series data, the timing chart that is possible to be used in an arbitrary domain can be obtained. Therefore, the user can use the timing chart verification aiding apparatus 10 for every test that require verification of the timing chart.

At step S403, the timing chart display unit 25 displays the timing chart displayed on the timing chart reshaping screen and the timing chart created in a superimposed manner, and ends the process flow.

Figure 9:
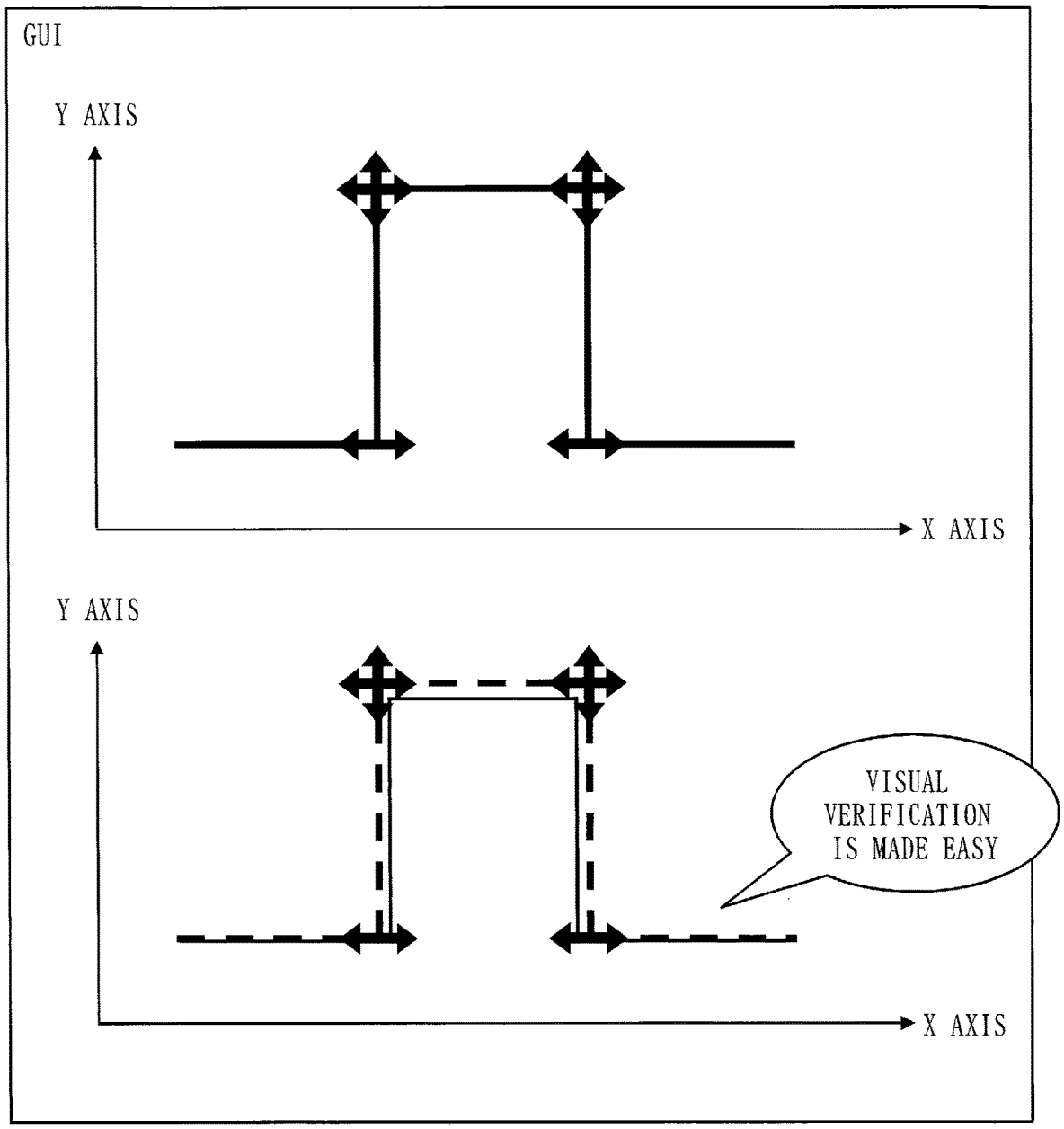
FIG. 9 is a diagram illustrating an example of a screen displayed by a timing chart display unit of a timing chart verification aiding apparatus according to Embodiment 1.

FIG. 9 illustrates an example of a timing chart display screen displayed by the timing chart display unit 25.

As in this example, the timing chart display unit 25 obtains time series data to be tested. The timing chart display unit 25 displays the timing chart that shows variations in values of the time series data obtained and the timing chart after being reshaped by the timing chart reshaping unit 23 in a superimposed manner on the screen.

In the example of FIG. 9, the timing chart on an upper side is to be created by the timing chart reshaping unit 23. The timing chart on a lower side is to be created by the timing chart display unit 25. The timing chart on the upper side is displayed in a dotted line so as to superimpose on the timing chart in a solid line on the lower side. In the final verification 35 done visually, if the vertex of the timing chart in a solid line is within the allowable range, the test becomes pass and if not, the test becomes fail.

FIG. 10 illustrates a specific example of the test specification 31 of FIG. 1.

There are, from the left, columns of a test procedure, an expected test result, and a verification result. Before outputting the result, the test procedure and the expected test result are already filled in, but the verification is blank.

Figure 12:
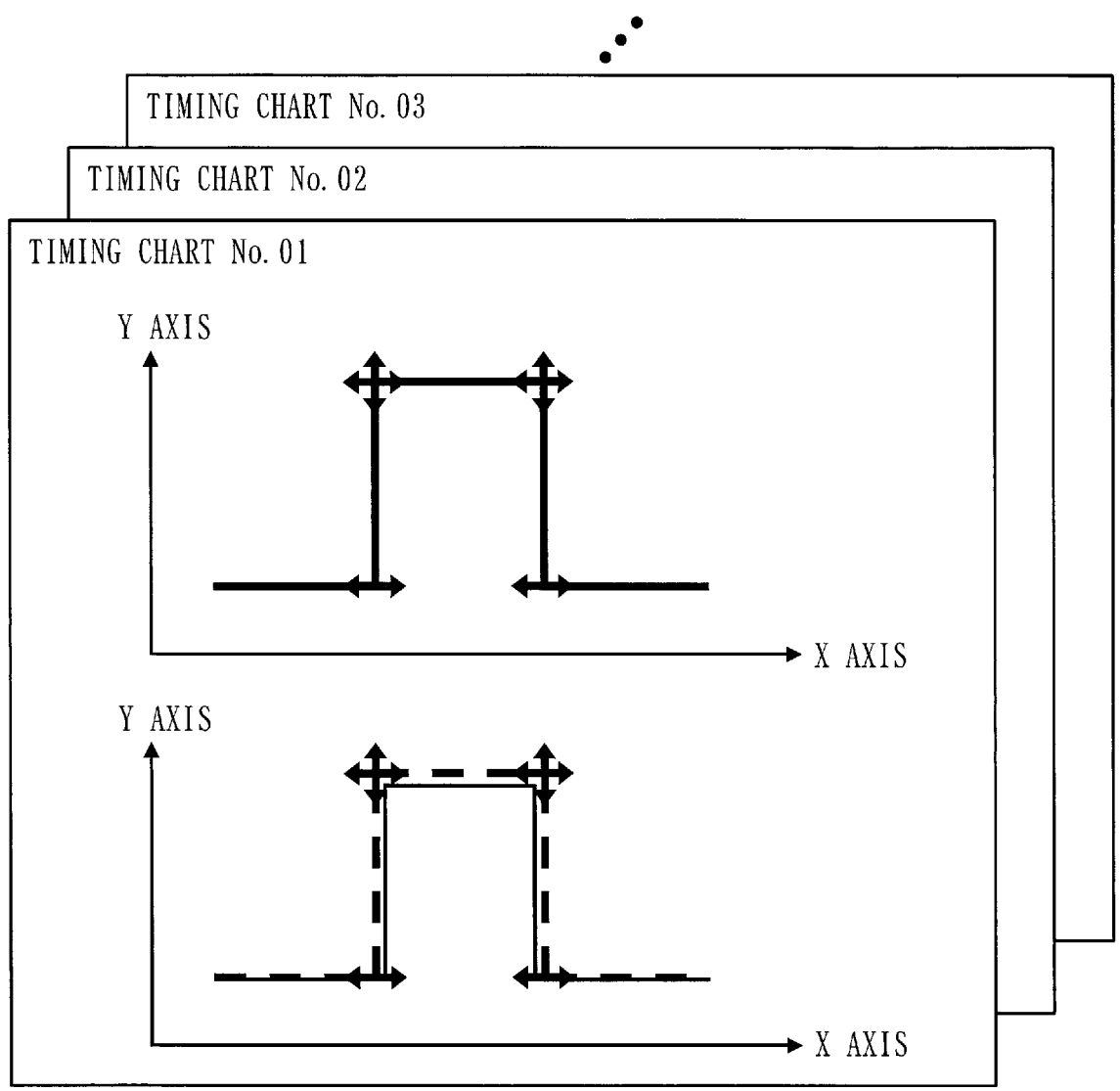
FIG. 12 is a diagram illustrating a specific example of a test specification after outputting a result.

FIG. 11 and FIG. 12 illustrate specific examples of the test specification 34 of FIG. 1.

As illustrated in FIG. 11, different from the test specification 31 before outputting the result, words are written in the verification result column. As illustrated in FIG. 12, the timing chart created by the timing chart reshaping unit 23 and the timing chart created by the timing chart display unit 25 are outputted to a different sheet as a part of the test specification 34.

FIG. 13 illustrates a specific example of the data 32 of FIG. 1. FIG. 14 illustrates a specific example of the data 33 of FIG. 1.

Each of the data 32 which is the test result and the data 33 which is the expected value, the allowable range, and the like, is a file in CSV format. "CSV" is an abbreviation for Comma Separated Values.

In the data 32 which is the test result, an X coordinate and a Y coordinate corresponding to a location of a vertex of the graph are indicated. That is, an X coordinate and a Y coordinate of a starting vertex, an X coordinate and a Y coordinate of a next point, • • •, and an X coordinate and a Y coordinate of an end point are indicated. When a plurality of graphs are to be indicated, a line break without a comma is inserted between the graphs.

In the data 33 which is the expected value, the allowable range, and the like, the X coordinate, the Y coordinate, and the allowable range corresponding to a location of a vertex of the graph that is expected are indicated. That is, an X coordinate and a Y coordinate of a starting vertex, an X coordinate and a Y coordinate of a next point, • • •, an X coordinate and a Y coordinate of an end point, an allowable range of the X coordinate of the starting vertex, an allowable range of the Y coordinate of the starting vertex, an allowable range of the X coordinate of the next point, an allowable range of the Y coordinate of the next point, • • •, an allowable range of the X coordinate of the end point, and an allowable range of the Y coordinate of the end point are indicated. When a plurality of graphs are to be indicated, a line break without a comma is inserted between the graphs.

*Description of Effect of Embodiment*

According to this embodiment, creating a timing chart with a high degree of freedom is possible.

This embodiment can be applied to every test where verification of a timing chart is required since a timing chart to be created is not domain specific.

In this embodiment, a timing chart with high degree of freedom can easily be created at the time of creating a timing chart based on a specification.

Specifically, if a timing chart is in a form that can be drawn with a broken line, drawing freely of a timing chart is possible.

In addition, visual verification of a timing chart having a height in a vertical axis direction becomes easy by displaying an arrow showing an allowable range of the timing chart based on a specification not only in a horizontal axis direction, but also in the vertical axis direction at the time of displaying the timing chart based on the specification for visual verification.

According to this embodiment, efficient creation of the timing chart regardless of the domain becomes possible, and detection of discrepancies in the specification itself may be aided.

According to this embodiment, an arbitrary waveform that can be drawn by a broken line can be inputted at the time of creating a timing chart that is expected based on the test specification 31.

According to this embodiment, an allowable range of a timing chart that is expected can be expressed graphically on a screen with an arrow and a dotted line so as to make visual verification easy.

*Other Configurations*

In this embodiment, functions of the rough sketch creation unit 21, the verification condition input aiding unit 22, the timing chart reshaping unit 23, the automatic verification unit 24, and the timing chart display unit 25 are realized by software, but as a variation, functions of the rough sketch creation unit 21, the verification condition input aiding unit 22, the timing chart reshaping unit 23, the automatic verification unit 24, and the timing chart display unit 25 may be realized by a combination of software and hardware. That is, some of the functions of the rough sketch creation unit 21, the verification condition input aiding unit 22, the timing chart reshaping unit 23, the automatic verification unit 24, and the timing chart display unit 25 may be realized by dedicated hardware and the rest may be realized by software.

The dedicated hardware is, for example, a single circuit, a composite circuit, a programmed processor, a parallel programmed processor, a logic IC, a GA, a FPGA, an ASIC, or a combination of at least some of these. "IC" is an abbreviation for Integrated Circuit. "GA" is an abbreviation for Gate Array. "FPGA" is an abbreviation for Field-Programmable Gate Array. "ASIC" is an abbreviation for Application Specific Integrated Circuit.

Each of the processor 11 and the dedicated hardware is a processing circuitry. That is, regardless of whether the functions of the rough sketch creation unit 21, the verification condition input aiding unit 22, the timing chart reshaping unit 23, the automatic verification unit 24, and the timing chart display unit 25 are realized by software or realized by a combination of software and hardware, the operations of the rough sketch creation unit 21, the verification condition input aiding unit 22, the timing chart reshaping unit 23, the automatic verification unit 24, and the timing chart display unit 25 are performed by the processing circuitry.

REFERENCE SIGNS LIST

10: timing chart verification aiding apparatus, 11: processor, 12: memory, 13: communication device, 14: input device, 15: display, 21: rough sketch creation unit, 22: verification condition input aiding unit, 23: timing chart reshaping unit, 24: automatic verification unit, 25: timing chart display unit, 31: test specification, 32: data, 33: data, 34: test specification, 35: final verification.

The invention claimed is:

1. A timing chart verification aiding apparatus comprising:
    processing circuitry to:
    accept operation to designate positions of a plurality of points on a screen, connect the plurality of points with a line, and create a rough sketch of a timing chart on the screen;
    accept operation to input a condition for verifying pass or fail of a test of at least one of the plurality of points on the screen;
    reshape on the screen, the timing chart created based on the condition for verifying; and
    obtain time series data to be tested, and display a timing chart that shows variations in values of the time series data obtained and the timing chart after being reshaped in a superimposed manner on the screen.

2. The timing chart verification aiding apparatus according to claim 1, wherein the processing circuitry
    accepts operation to input, as the condition for verifying, an expected value of the position of at least one of the plurality of points, and
    reshapes the timing chart created by setting the position of the corresponding point to the expected value.

3. The timing chart verification aiding apparatus according to claim 1, wherein the processing circuitry
    accepts operation to input, as the condition for verifying, an event value that indicate either one of rising and falling for at least one of the plurality of points, and
    reshapes the timing chart created by setting a direction of the line connected to the corresponding point to the event value accepted.

4. The timing chart verification aiding apparatus according to claim 1, wherein the processing circuitry
    accepts operation to input, as the condition for verifying, an allowable range of deviation for at least one of the plurality of points, and
    adds to the timing chart reshaped, a shape showing the allowable range accepted.

5. The timing chart verification aiding apparatus according to claim 4, wherein
    the allowable range is set at least along an axis orthogonal to a time axis.

6. The timing chart verification aiding apparatus according to claim 4, wherein
    the shape is an arrow extending at least along the axis orthogonal to the time axis.

7. The timing chart verification aiding apparatus according to claim 1, wherein the processing circuitry
    creates as a rough sketch, an arbitrary waveform shown by a broken line.

8. A timing chart verification aiding method comprising:
    accepting operation to designate positions of a plurality of points on a screen, connecting the plurality of points with a line, and creating a rough sketch of a timing chart on the screen, by a rough sketch creation unit;
    accepting operation to input a condition for verifying pass or fail of a test of at least one of the plurality of points on the screen, by a verification condition input aiding unit;
    reshaping on the screen, the timing chart created by the rough sketch creation unit based on the condition for verifying accepted by the verification condition input aiding unit, by a timing chart reshaping unit; and
    obtaining time series data to be tested, and displaying a timing chart that shows variations in values of the time series data obtained and the timing chart after being reshaped by the timing chart reshaping unit in a superimposed manner on the screen, by a timing chart display unit.

9. A non-transitory computer readable medium storing a timing chart verification aiding program causing a computer to execute:
    a rough sketch creation process to accept operation to designate positions of a plurality of points on a screen, connect the plurality of points with a line, and create a rough sketch of a timing chart on the screen;
    a verification condition input aiding process to accept operation to input a condition for verifying pass or fail of a test of at least one of the plurality of points on the screen;
    a timing chart reshaping process to reshape on the screen, the timing chart created by the rough sketch creation process based on the condition for verifying accepted by the verification condition input aiding process; and
    a timing chart display process to obtain time series data to be tested, and display a timing chart that shows variations in values of the time series data obtained and the timing chart after being reshaped by the timing chart reshaping process in a superimposed manner on the screen.

* * * * *